United States Patent
Ueda et al.

(10) Patent No.: US 9,163,578 B2
(45) Date of Patent: Oct. 20, 2015

(54) CONTROL DEVICE FOR INTERNAL COMBUSTION ENGINE

(75) Inventors: Koichi Ueda, Susono (JP); Kota Sata, Susono (JP); Shinichi Soejima, Gotenba (JP); Kaoru Ohtsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1239 days.

(21) Appl. No.: 12/672,375

(22) PCT Filed: Oct. 15, 2008

(86) PCT No.: PCT/JP2008/068650
§ 371 (c)(1),
(2), (4) Date: Jan. 7, 2011

(87) PCT Pub. No.: WO2010/044148
PCT Pub. Date: Apr. 22, 2010

(65) Prior Publication Data
US 2011/0098905 A1 Apr. 28, 2011

(51) Int. Cl.
*F02D 41/30* (2006.01)
*F02D 37/02* (2006.01)
(Continued)

(52) U.S. Cl.
CPC ............ *F02D 41/3023* (2013.01); *F02D 37/02* (2013.01); *F02D 41/0002* (2013.01);
(Continued)

(58) Field of Classification Search
CPC .................... F02D 2041/3052; F02D 41/3023; F02D 41/0002; F02D 41/40; F02D 41/401; F02D 2250/18; F02D 2250/32
USPC .......... 701/102, 103; 123/295, 299, 300, 301, 123/430
See application file for complete search history.

(56) References Cited

U.S. PATENT DOCUMENTS 4,671,235 A * 6/1987 Hosaka ......................... 123/352
5,755,198 A 5/1998 Grob et al.
(Continued)

FOREIGN PATENT DOCUMENTS

EP 1 199 469 A2 4/2002
EP 1 473 455 A2 11/2004
(Continued)

OTHER PUBLICATIONS

International Search Report issued in International Application No. PCT/JP2008/068650 on Dec. 2, 2008. (with translation).
(Continued)

*Primary Examiner* — Lindsay Low
*Assistant Examiner* — Robert Werner
(74) *Attorney, Agent, or Firm* — Oliff PLC (57) ABSTRACT

Disclosed are a control device and a control method that are used with an internal combustion engine in which the air-fuel ratio in the vicinity of an ignition plug differs from the overall air-fuel ratio in a cylinder, and capable of properly fulfilling demands concerning various capabilities of the internal combustion engine by accurately reflecting each of the demands in the operation of each actuator. Three physical quantities, namely, a torque, an efficiency, and an air-fuel ratio, are used as controlled variables for the internal combustion engine. Target values for the controlled variables are then set by integrating at least some of demands concerning a capability of the internal combustion engine into the three physical quantities. Further, in accordance with the target values for the three controlled variables, namely, the torque, the efficiency, and the air-fuel ratio, three operation amounts, namely, an intake air amount adjustment valve opening, an ignition timing, and a fuel injection amount are set, and a fourth operation amount for adjusting the air-fuel ratio distribution in the cylinder is set.

5 Claims, 5 Drawing Sheets

(51) Int. Cl.
  *F02D 41/00* (2006.01)
  *F02D 41/40* (2006.01)
  *F02D 41/14* (2006.01)

(52) U.S. Cl.
  CPC ............ *F02D41/40* (2013.01); *F02D 41/3029* (2013.01); *F02D 2041/1434* (2013.01); *F02D 2250/18* (2013.01); *Y02T 10/42* (2013.01); *Y02T 10/44* (2013.01)

(56) References Cited

U.S. PATENT DOCUMENTS

| | | | | |
|---|---|---|---|---|
| 5,988,137 | A * | 11/1999 | Tamura et al. | 123/295 |
| 6,145,489 | A * | 11/2000 | Kazama et al. | 123/295 |
| 6,244,241 | B1 * | 6/2001 | Mamiya et al. | 123/295 |
| 6,497,212 | B2 * | 12/2002 | Matsumoto et al. | 123/295 |
| 6,520,142 | B2 * | 2/2003 | Nogi et al. | 123/299 |
| 6,681,739 | B2 * | 1/2004 | Mamiya et al. | 123/295 |
| 6,857,414 | B2 * | 2/2005 | Ogawa et al. | 123/295 |

FOREIGN PATENT DOCUMENTS

| | | |
|---|---|---|
| JP | A-10-141115 | 5/1998 |
| JP | A-2000-310135 | 11/2000 |
| JP | A-2002-332886 | 11/2002 |
| JP | 2003301766 A * | 10/2003 |
| JP | A-2003-301766 | 10/2003 |
| JP | A-2008-231986 | 10/2008 |

OTHER PUBLICATIONS

International Preliminary Report on Patentability issued in International Application No. PCT/JP2008/068650 dated May 17, 2011 (with translation).

* cited by examiner

CONTROL DEVICE FOR INTERNAL COMBUSTION ENGINE

TECHNICAL FIELD

The present invention relates to a control device for an internal combustion engine, and more particularly to a control device for an internal combustion engine in which the air-fuel ratio in the vicinity of an ignition plug differs from the overall air-fuel ratio in a cylinder.

BACKGROUND ART

A technology known as being related to internal combustion engine torque control is disclosed, for instance, in JP-A-2003-301766. This technology calculates an indicated torque demanded by a driver in accordance with an accelerator opening and determines a target air-fuel ratio in a control device. Next, this technology corrects the demanded indicated torque in accordance with torque efficiency relative to ignition timing and torque efficiency relative to the target air-fuel ratio, and determines a target throttle opening in accordance with a target air amount that is derived from the corrected torque. Further, this technology calculates an intake retard correction amount from the target air amount and engine speed, calculates an ignition timing retard amount from the corrected torque and an estimated torque derived from the intake retard correction amount, and determines a final ignition timing from the ignition timing retard amount and a basic ignition timing derived from an in-cylinder air amount. Moreover, this technology determines a target fuel injection amount from the in-cylinder air amount and target air-fuel ratio. In other words, the technology disclosed in JP-A-2003-301766 sets a throttle opening, an ignition timing, and a fuel injection amount, which are three typical operation amounts, in such a manner as to achieve both the demanded indicated torque, which is demanded by the driver, and the target air-fuel ratio, which is demanded internally by the control device.

Two different modes of air-fuel mixture combustion in an internal combustion engine are known: homogeneous combustion and stratified charge combustion. Homogeneous combustion takes place while air and fuel are uniformly mixed within a cylinder. On the other hand, stratified charge combustion takes place while a rich air-fuel mixture layer is formed near an ignition plug with a lean air-fuel mixture layer formed around the rich air-fuel mixture layer. In homogeneous combustion, the concentration of an air-fuel mixture is uniform within a cylinder so that the air-fuel ratio in the vicinity of the ignition plug is equal to the overall air-fuel ratio (average air-fuel ratio) in the cylinder. In stratified charge combustion, on the other hand, the fuel gathers around the ignition plug so that the air-fuel ratio of a combustion gas near the ignition plug differs from the overall air-fuel ratio in the cylinder.

It is conceivable that the technology disclosed in JP-A-2003-301766 is designed for an internal combustion engine in which homogeneous combustion occurs. As for an internal combustion engine in which homogeneous combustion occurs, the technology disclosed, for instance, in JP-A-2003-301766 can be used to exercise torque control by adjusting three actuator operation amounts, namely, the throttle opening, ignition timing, and fuel injection amount. Torque can be controlled by adjusting an intake air amount, ignition timing, and combustion air-fuel ratio. In the case of homogeneous combustion, however, the air-fuel ratio in the vicinity of an ignition plug coincides with the overall air-fuel ratio in a cylinder. Therefore, torque control can be exercised by determining the intake air amount from the throttle opening and determining the overall air-fuel ratio in a cylinder from the intake air amount and fuel injection amount.

As for an internal combustion engine in which stratified charge combustion occurs so that the air-fuel ratio in the vicinity of the ignition plug differs from the overall air-fuel ratio in the cylinder, proper torque control cannot be exercised by adjusting the above-mentioned three operation amounts alone. If the air-fuel ratio in the vicinity of the ignition plug varies in a situation where the overall air-fuel ratio in the cylinder remains unchanged, the combustion rate varies. As a result, the relationship between torque and ignition timing (hereinafter referred to as the torque-ignition timing characteristic) varies. Therefore, when torque control is to be exercised in this type of internal combustion engine, it is necessary to adjust the air-fuel ratio in the vicinity of the ignition plug (i.e., actual combustion air-fuel ratio) in addition to the overall air-fuel ratio in the cylinder. However, such an adjustment cannot be made by controlling the above-mentioned three operation amounts alone. To achieve a target torque while achieving a target air-fuel ratio, it is necessary to use another operation amount in addition to the above-mentioned three operation amounts.

As regards the technology disclosed in JPA-2003-301766, it can be considered that the demanded indicated torque is a demand concerning drivability, and that the target air ratio is a demand concerning exhaust gas. Drivability and exhaust gas control both are capabilities of the internal combustion engine. In addition, the internal combustion engine has various other capabilities such as fuel economy and knock control. There is a demand for each capability. If, for instance, a target capability is fuel economy, there may be a demand for combustion efficiency enhancement or a demand for pump loss reduction. If the target capability is exhaust gas control, on the other hand, there may be a demand for increasing an exhaust gas temperature or a demand for facilitating a reaction in a catalyst. As described above, various capabilities concerning the internal combustion engine exist, and various demands on different levels may be issued in relation to each capability. However, the technology disclosed in JP-A-2003-301766 meets only some of such demands and still needs further improvement to accommodate a variety of demands about the internal combustion engine.

DISCLOSURE OF THE INVENTION

The present invention has been made in view of the above circumstances. An object of the present invention is to provide a control device that is used with an internal combustion engine in which the air-fuel ratio in the vicinity of an ignition plug differs from the overall air-fuel ratio in a cylinder, and capable of properly fulfilling demands concerning various capabilities of the internal combustion engine by accurately reflecting the demands in the operation of each actuator.

The device and method for controlling an internal combustion engine in accordance with the present invention are designed to control an internal combustion engine in which the air-fuel ratio in the vicinity of an ignition plug differs from the overall air-fuel ratio in a cylinder. More specifically, the present invention can control an internal combustion engine in which stratified charge combustion or other similar combustion occurs while the air-fuel ratio in a cylinder is intentionally made nonuniform. Further, an internal combustion engine in which homogeneous combustion occurs can also be controlled by the present invention as far as the air-fuel ratio distribution in a cylinder turns out to be nonuniform depending on the operating status.

According to the present invention, three physical quantities, namely, a torque, an efficiency, and an air-fuel ratio, are used as controlled variables for the internal combustion engine. A target value for each controlled variable is set when at least some of the demands concerning the capabilities of the internal combustion engine are integrated into the three physical quantities. The output of the internal combustion engine includes heat and exhaust gas in addition to torque. This entire output determines the capabilities of the internal combustion engine. Further, the torque, efficiency, and air-fuel ratio are three elements that determine the output of the internal combustion engine. Therefore, when at least some of the demands concerning the capabilities of the internal combustion engine are integrated into the aforementioned three physical quantities and used as the target values for the controlled variables, the demands can be properly reflected in the output of the internal combustion engine.

According to the present invention, the three operation amounts, namely, the opening of an intake air amount adjustment valve, ignition timing, and fuel injection amount, are set in accordance with the target values for the three controlled variables, namely, the torque, efficiency, and air-fuel ratio. The amount of air taken into a cylinder can be adjusted by changing the opening of the intake air amount adjustment valve. The efficiency can be mainly controlled by changing the ignition timing. The overall air-fuel ratio in a cylinder can be mainly controlled by changing the fuel injection amount.

According to the present invention, a fourth operation amount, which adjusts the air-fuel ratio distribution in a cylinder, is set in addition to the three operation amounts, namely, the intake air amount adjustment valve opening, ignition timing, and fuel injection amount. When the air-fuel ratio in the entire cylinder is uniform, torque control can be exercised by adjusting the intake air amount, efficiency, and air-fuel ratio with the aforementioned three operation amounts. In the internal combustion engine to be controlled by the present invention, however, the air-fuel ratio in the vicinity of the ignition plug differs from the overall in-cylinder air-fuel ratio. Therefore, it is difficult to exercise precise torque control in accordance with the intake air amount, efficiency, and overall in-cylinder air-fuel ratio alone. In this respect, the present invention uses the aforementioned fourth operation amount to adjust the in-cylinder air-fuel ratio distribution. This makes it possible to control the air-fuel ratio in the vicinity of the ignition plug in addition to the overall in-cylinder air-fuel ratio. Consequently, precise torque control can be exercised.

When, for instance, the internal combustion engine to be controlled by the present invention can inject fuel directly into a cylinder, the fourth operation amount includes the timing of fuel injection into a cylinder. The time at which a gas clump having a rich air-fuel ratio, which is generated upon fuel injection, reaches the vicinity of the ignition plug can be adjusted by changing the fuel injection timing. The fourth operation amount also includes, for instance, the valve timing of an intake valve, which is adjusted by a valve timing adjustment mechanism, and the valve opening of a swirl control valve or tumble control valve. These operation amounts can be used to adjust the speed at which the gas clump having a rich air-fuel ratio, which is generated upon in-cylinder fuel injection or taken in from an intake port, is transported to the vicinity of the ignition plug.

According to the present invention, each of the above-described four operation amounts are set and output to corresponding actuators to be operated. The intake air amount adjustment valve opening, which is an operation amount, is output to the intake air amount adjustment valve. The intake air amount adjustment valve according to the present invention includes not only a throttle but also an intake valve that varies its lift amount or operating angle. The ignition timing, which is another operation amount, is output to an ignition device. The fuel injection amount, which is another operation amount, is output to a fuel injection device. The fuel injection device may inject fuel directly into a cylinder or inject fuel into the intake port. Alternatively, the fuel injection device may inject part of fuel into the intake port and inject the remaining fuel directly into the cylinder. When, for instance, the fourth operation amount is the fuel injection timing, it is output to the fuel injection device together with the fuel injection amount. In this instance, however, it is assumed that the fuel injection device can inject at least part of fuel directly into the cylinder. The fourth operation amount may be output to an intake valve timing adjustment mechanism, swirl control valve, tumble control valve, or other actuator depending on the type of operation amount.

According to another aspect (second aspect) of the present invention, means for setting the aforementioned operation amounts generates a target value for the air-fuel ratio in the vicinity of the ignition plug in accordance with a predetermined rule, and calculates the operation amounts from the target values for the three controlled variables (torque, efficiency, and air-fuel ratio) and the generated target value for the air-fuel ratio in the vicinity of the ignition plug. The torque-ignition timing characteristic depends on the air-fuel ratio in the vicinity of the ignition plug. Therefore, precise torque control can be exercised when the target value for such an air-fuel ratio is generated internally and used to calculate the operation amounts.

According to another aspect (third aspect) of the present invention, the means for setting the aforementioned operation amounts has a fixed value representing the target value for the air-fuel ratio in the vicinity of the ignition plug. When this fixed value is used to calculate each operation amount, the air-fuel ratio in the vicinity of the ignition plug can be controlled and maintained constant.

According to another aspect (fourth aspect) of the present invention, the means for setting the aforementioned operation amounts has a fixed value representing the target value for the air-fuel ratio in the vicinity of the ignition plug in each operating state of the internal combustion engine. When each operation amount is calculated with the target value changed to match each operation state of the internal combustion engine, control can be exercised so that the air-fuel ratio in the vicinity of the ignition plug is optimized for each operating state of the internal combustion engine. This makes it possible to enhance the accuracy of torque control.

According to another aspect (fifth aspect) of the present invention, the means for setting the aforementioned operation amounts predefines a target relationship between the overall in-cylinder air-fuel ratio and the air-fuel ratio in the vicinity of the ignition plug. When this target relationship is used to determine the target value for the air-fuel ratio in the vicinity of the ignition plug from the target value for the air-fuel ratio, which is a controlled variable, and calculate each operation amount, control can be exercised so that the air-fuel ratio in the vicinity of the ignition plug is optimized for the overall in-cylinder air-fuel ratio. This makes it possible to enhance the accuracy of torque control.

According to another aspect (sixth aspect) of the present invention, the means for setting the aforementioned operation amounts first calculates the three operation amounts, namely, the intake air amount adjustment valve opening, ignition timing, and fuel injection amount, in accordance with the target values for the three controlled variables, namely, the torque, efficiency, and air-fuel ratio. Next, the means for setting the aforementioned operation amounts calculates, as a target value for the air-fuel ratio in the vicinity of the ignition plug, a combustion air-fuel ratio necessary for achieving the target values for the three controlled variables, namely, the torque, efficiency, and air-fuel ratio, during the use of the three operation amounts. The aforementioned fourth operation amount is calculated by using the target value for the air-fuel ratio in the vicinity of the ignition plug, which is calculated as described above. In other words, after the intake air amount adjustment valve opening, ignition timing, and fuel injection amount are preferentially determined, a target value for the combustion air-fuel ratio is set so as to compensate for the differences between each of the values of the controlled variables that can be actually achieved by use of the determined intake air amount adjustment valve opening, ignition timing, and fuel injection amount and each of the target values for such controlled variables. Finally, the aforementioned fourth operation amount is determined. When each operation amount is set by performing the above-described procedure, the three controlled variables, namely, the torque, efficiency, and air-fuel ratio, can be controlled simultaneously with high accuracy to follow their target values in any operating state.

According to still another aspect (seventh aspect) of the present invention, the means for setting the aforementioned operation amounts first calculates the intake air amount adjustment valve opening, ignition timing, and fuel injection amount in accordance with the target values for the three controlled variables, namely, the torque, efficiency, and air-fuel ratio. Next, the means for setting the aforementioned operation amounts calculates the fourth operation amount from the fuel injection amount, which is an operation amount, and the target value for the air-fuel ratio in the vicinity of the ignition plug. In other words, the three operation amounts, namely, the intake air amount adjustment valve opening, ignition timing, and fuel injection amount, are calculated directly from the target values for the three controlled variables, namely, the torque, efficiency, and air-fuel ratio, whereas the fourth operation amount is calculated from the fuel injection amount and the target value for the air-fuel ratio of a combustion gas in the vicinity of the ignition plug. When each operation amount is set by performing the above-described procedure, each of the target values for the controlled variables can be accurately reflected in the four different operation amounts including the fourth operation amount while avoiding the complication of a calculation process necessary for the conversion of the controlled variables to the operation amounts.

DESCRIPTION OF REFERENCE NUMERALS

2 . . . Throttle
4 . . . Ignition device
6 . . . Fuel injection device
8 . . . Swirl control valve
10 . . . Capability demand generation section
12, 14, 16 . . . Demand output element
20 . . . Target value setup section
22 . . . Torque mediation element
24 . . . Efficiency mediation element
26 . . . A/F mediation element
30 . . . Achievement section
40 . . . Achievement section
302 . . . Conversion section
304 . . . Target combustion A/F setup section
312 . . . Conversion section
314 . . . Target combustion A/F setup section
316 . . . Conversion section
322 . . . Conversion section
324 . . . Target combustion A/F setup section
326 . . . Conversion section
402 . . . Conversion section
404 . . . Target combustion A/F setup section

BEST MODE FOR CARRYING OUT THE INVENTION

First Embodiment

A first embodiment of the present invention will now be described with reference to FIGS. 1 and 2.

First of all, the specifications for an internal combustion engine according to the first embodiment will be described as its prerequisites. The internal combustion engine according to the present embodiment operates while stratified charge combustion occurs. As actuators that control its operation, the internal combustion engine according to the present embodiment includes a throttle 2, which serves as an intake air amount adjustment valve; an ignition device 4, which adjusts the ignition timing; and a fuel injection device 6, which injects fuel directly into a cylinder. The specifications for the internal combustion engine according to the present embodiment are common to the internal combustion engine according to a second embodiment or a third embodiment, both of which will be described later.

Figure 1:
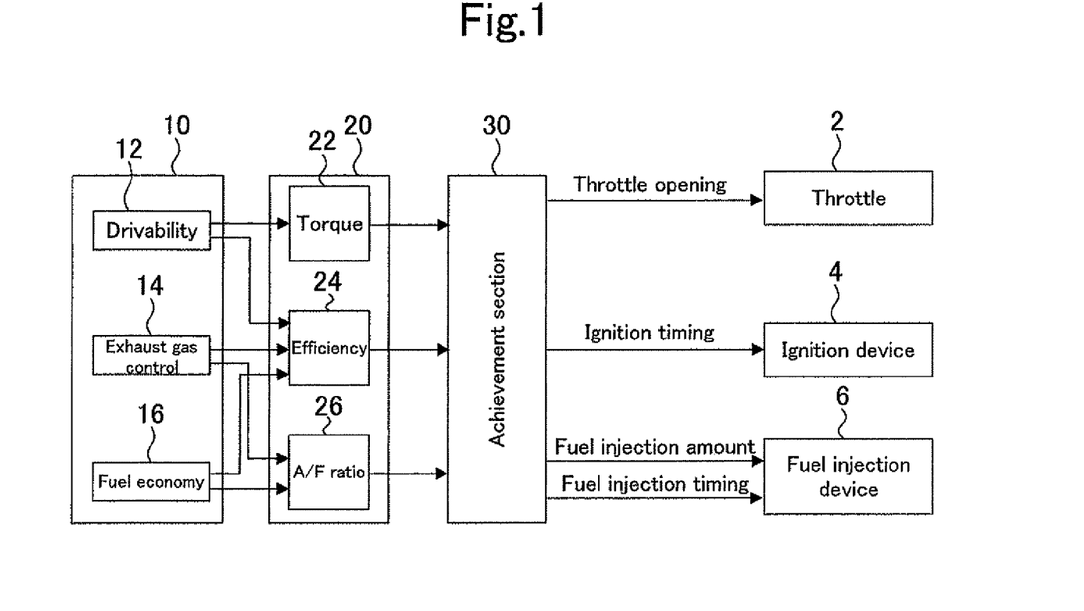
FIG. 1 is a block diagram illustrating the configuration of an internal combustion engine control device according to a first embodiment of the present invention.

A control device according to the present embodiment is configured as shown in a block diagram of FIG. 1. FIG. 1 shows each element of the control device in the form of a block. Signal transmissions (main signal transmissions) between the blocks are indicated by arrows. The overall configuration and features of the control device according to the present embodiment will be described below with reference to FIG. 1.

As shown in FIG. 1, the control device is roughly divided into three sections 10, 20, 30. The top-level section is a capability demand generation section 10. A target value setup section 20 is provided below the capability demand generation section 10. Further, an achievement section 30 is provided below the target value setup section 20. The aforementioned actuators 2, 4, 6 are connected to the achievement section 30. In addition to the signals transmitted between the blocks as indicated by the arrows in FIG. 1, various other signals flow within the control device. Some of them contain engine information that indicates internal combustion engine operating conditions and operating status. The engine information includes, for instance, an engine speed, throttle opening sensor output value, air-fuel ratio sensor output value, current ignition timing, cooling water temperature, intake valve timing, and exhaust valve timing.

The configurations of the individual sections 10, 20, 30 of the control device and the processes performed in such sections will be described below in sequence.

The capability demand generation section 10 includes a plurality of demand output elements 12, 14, 16. The demand output elements 12, 14, 16 are provided for each capability of the internal combustion engine. The capabilities of the internal combustion engine include drivability, exhaust gas control, fuel economy, noise control, and vibration control. It can be said that these capabilities are performance requirements of the internal combustion engine. The demand output elements to be provided in the capability demand generation section 10 vary depending on what is demanded of the internal combustion engine and what is given priority. The present embodiment is configured so as to provide the demand output element 12 for a capability related to drivability, the demand output element 14 for a capability related to exhaust gas control, and the demand output element 16 for a capability related to fuel economy.

The demand output elements 12, 14, 16 quantify a demand concerning a capability of the internal combustion engine and output the quantified demand. As the operation amounts of the actuators 2, 4, 6 are to be computed, a capability demand can be reflected in the operation amounts of the actuators 2, 4, 6 when it is quantified. The present embodiment assumes that three physical quantities, namely, a torque, an efficiency, and an A/F ratio (air-fuel ratio), are used as physical quantities that express a capability demand. The reason is that a demand concerning various capabilities of the internal combustion engine, such as drivability, exhaust gas control, or fuel economy, can be expressed by one of the three physical quantities, namely, the torque, efficiency, or A/F ratio. The efficiency is related to thermal energy convertible to torque and equivalent to the efficiency of conversion of thermal energy to torque. It is a dimensionless parameter that is set with reference to MBT ignition timing.

FIG. 1 shows an example in which the demand output element 12 outputs a demanded value that expresses a demand concerning drivability in terms of torque and efficiency. The demand output element 14 outputs a demanded value that expresses a demand concerning exhaust gas in terms of efficiency and A/F ratio. The demand output element 16 outputs a demanded value that expresses a demand concerning fuel economy in terms of efficiency and A/F ratio. The number of demanded values output from the demand output elements 12, 14, 16 is not limited to one per physical quantity. For example, the demand output element 12 not only outputs a torque demanded from a driver, but also outputs torques demanded from various devices related to vehicle control. This is also true for the efficiency and A/F ratio.

The target value setup section 20 will now be described. The target value setup section 20 sets target values for controlled variables for the internal combustion engine. The control device according to the present embodiment uses the aforementioned torque, efficiency, and A/F ratio as the controlled variables for the internal combustion engine. As described earlier, the demands concerning various capabilities of the internal combustion engine can be expressed by one of the three physical quantities, namely, the torque, efficiency, or A/F ratio. In addition, the torque, efficiency, and A/F ratio are three elements that determine the output of the internal combustion engine. The output of the internal combustion engine includes heat and exhaust gas in addition to the torque. The entire output of the internal combustion engine determines various capabilities of the internal combustion engine such as the aforementioned drivability, exhaust gas control, and fuel economy. Therefore, when the three physical quantities, namely, the torque, efficiency, and A/F ratio, are handled as the controlled variables for the internal combustion engine, capability demands can be precisely reflected in the output of the internal combustion engine.

The target value setup section 20 sets target values for the controlled variables by integrating a plurality of capability demands that are output from the capability demand generation section 10. The target value setup section 20 includes mediation sections 22, 24, 26, which respectively handle the associated controlled variables. A torque mediation section 22 integrates demanded values expressed in terms of torque into a torque demanded value for mediation purposes, and sets the torque demanded value as a target value for the torque, which is a controlled variable. An efficiency mediation section 24 integrates demanded values expressed in terms of efficiency into an efficiency demanded value for mediation purposes, and sets the efficiency demanded value as a target value for the efficiency, which is a controlled variable. An A/F mediation section 26 integrates demanded values expressed in terms of an air-fuel ratio into an A/F demanded value for mediation purposes, and sets the A/F demanded value as a target value for the A/F ratio, which is a controlled variable. Mediation is a process for determining the most satisfactory numerical value in consideration of the priority of each capability demand and the relationship between capability demands. The mediation sections 22, 24, 26 perform mediation in accordance with predetermined rules. Here, the predetermined rules are calculation rules for obtaining a numerical value from a plurality of numerical values, such as maximum value selection, minimum value selection, averaging, and superposition rules. The predetermined rules may be obtained by combining such a plurality of calculation rules as appropriate. However, the contents of the predetermined rules for mediation are not definitely fixed and can be freely defined by design personnel.

The achievement section 30 will now be described. The achievement section 30 calculates the operation amounts of the actuators 2, 4, 6 that are needed to achieve the target values for the three controlled variables, namely, the torque, efficiency, and A/F ratio, which are set by the target value setup section 20. The operation amounts calculated by the achievement section 30 are a throttle opening for operating the throttle 2, an ignition timing for operating the ignition device 4, and a fuel injection amount and fuel injection timing for operating the fuel injection device 6.

If the internal combustion engine operates by performing homogeneous combustion, three operation amounts, namely, the throttle opening, ignition timing, and fuel injection amount, will suffice. However, if the internal combustion engine operates by performing stratified charge combustion, the above-mentioned three operation amounts are not enough to exercise proper torque control. When stratified charge combustion occurs, the actual combustion A/F ratio differs from the overall in-cylinder A/F ratio. However, only the overall in-cylinder A/F ratio can be directly adjusted by the above-mentioned three operation amounts. As the combustion A/F ratio affects the torque-ignition timing characteristic, it is necessary to adjust the actual combustion A/F ratio in addition to the overall in-cylinder A/F ratio. However, the actual combustion A/F ratio cannot be adjusted by the above-mentioned three operation amounts alone. In regard to this point, the control device according to the present embodiment uses the fuel injection timing as an operation amount in addition to the throttle opening, ignition timing, and fuel injection amount. When the fuel injection timing changes, the flow of a sprayed fuel in a cylinder also changes, thereby changing the calculated concentration of a rich air-fuel mixture near the ignition plug as well. Therefore, when the fuel injection timing is used as an operation amount, it is possible to adjust the actual combustion A/F ratio in addition to the overall in-cylinder A/F ratio.

Figure 2:
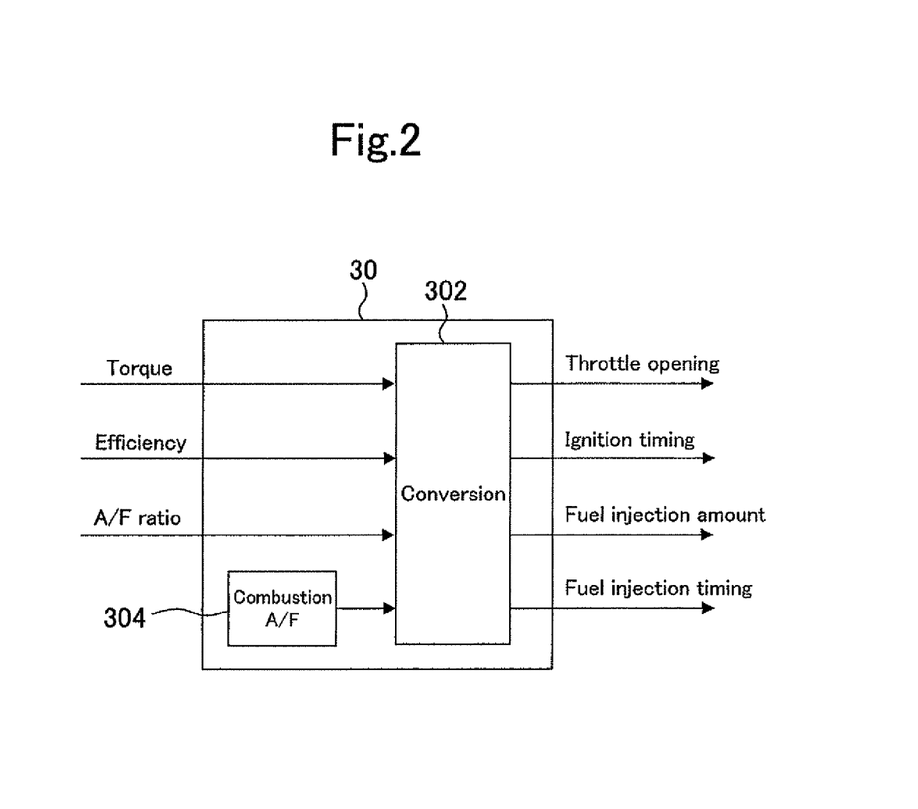
FIG. 2 is a block diagram illustrating the configuration of an achievement section according to the first embodiment of the present invention.

FIG. 2 is a block diagram illustrating the configuration of the achievement section 30. The achievement section 30 according to the present embodiment includes a target combustion A/F setup section 304. The target combustion A/F setup section 304 has a fixed value representing a target value for the combustion A/F ratio. Although the combustion A/F ratio is an important torque factor that governs the torque-ignition timing characteristic, it is not used as a controlled variable. The present embodiment uses the overall in-cylinder A/F ratio as a controlled variable. Precise torque control can be exercised when the target value for the combustion A/F ratio is generated within the achievement section 30 and used to calculate an actuator operation amount.

The achievement section 30 uses a conversion section 302 to calculate each operation amount. The conversion section 302 is an inverse model of the internal combustion engine according to the present embodiment, and composed of a plurality of statistical models and physical models that are expressed by maps and functions. The target values for the three controlled variables, namely, the torque, efficiency, and A/F ratio, and the target value for the combustion A/F ratio are input into the conversion section 302. The conversion section 302 outputs four operation amounts converted from such target values, namely, the throttle opening, ignition timing, fuel injection amount, and fuel injection timing. The engine information such as the engine speed is referenced during a conversion process in the conversion section 302.

Meanwhile, various operations of the control device according to the present embodiment can be performed by a program that is loaded into a memory and executed by the control device, which is a computer. The program includes codes that perform the steps of:

a) using the three physical quantities, namely, the torque, efficiency, and air-fuel ratio, as the controlled variables for the internal combustion engine, and setting the target values for the controlled variables by integrating at least some of the demands concerning the capabilities of the internal combustion engine into the three physical quantities;

b) setting the three operation amounts, namely, the throttle opening, ignition timing, and fuel injection amount, and the fourth operation amount for adjusting the in-cylinder air-fuel ratio distribution, namely, the fuel injection timing in accordance with the target values for the three controlled variables, namely, the torque, efficiency, and air-fuel ratio; and c) outputting each of the set four operation amounts to the corresponding actuators to be operated.

The program can be stored on a recording medium, such as a ROM, and included in the control device.

Figure 3:
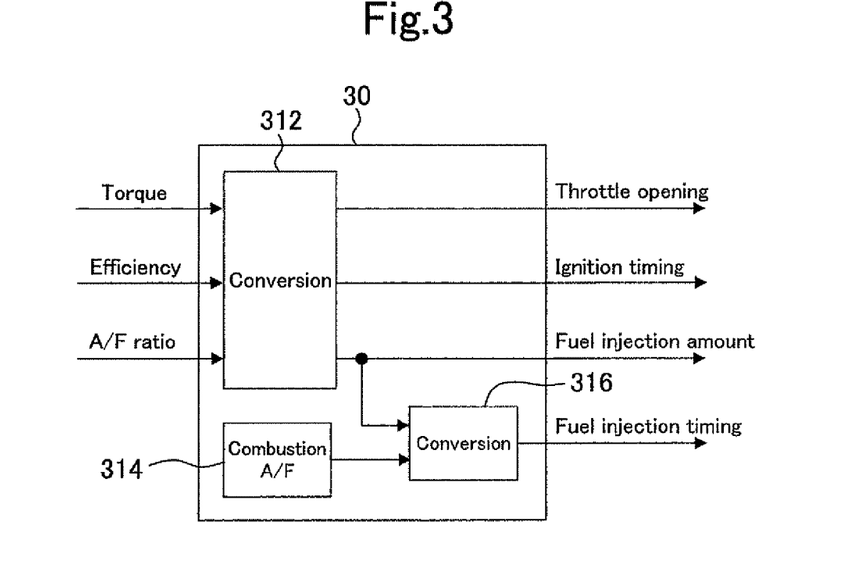
FIG. 3 is a block diagram illustrating the configuration of the achievement section according to a second embodiment of the present invention.

The first embodiment of the present invention is as described above. In the configuration shown in FIG. 1, the target value setup section 20 corresponds to "target value setup means" according to the present invention; and the achievement section 30 corresponds to "operation amount setup means" and "operation amount output means" according to the present invention. The achievement section 30 configured as shown in FIG. 3 corresponds to the "operation amount setup means" according to the second and third aspects of the present invention.

The first embodiment assumes that the target value for the combustion A/F ratio is a fixed value. Alternatively, however, the target combustion A/F setup section 304 may have a fixed value that represents the target combustion A/F ratio for each operating state of the internal combustion engine. This alternative provides enhanced torque control accuracy as it optimizes the combustion A/F ratio in accordance with the operating status of the internal combustion engine. In this instance, the achievement section 30 configured as shown in FIG. 2 corresponds to the "operation amount setup means" according to the second and fourth aspects of the present invention. Another alternative is to predefine the target relationship between the overall in-cylinder A/F ratio and actual combustion A/F ratio and let the target combustion A/F setup section 304 determine the target value for the combustion A/F ratio from the target value for the A/F ratio that is a controlled variable. This alternative also provides enhanced torque control accuracy as it optimizes the combustion A/F ratio in accordance with the target value for the overall in-cylinder A/F ratio. In this instance, the achievement section 30 included in the configuration shown in FIG. 2 corresponds to the "operation amount setup means" according to the second and fifth aspects of the present invention.

Second Embodiment

A second embodiment of the present invention will now be described with reference to FIGS. 1, 3, and 4.

The overall configuration of the control device according to the present embodiment is indicated by the block diagram in FIG. 1, as is the case with the first embodiment. The control device according to the present embodiment differs from the control device according to the first embodiment in the configuration and functions of the achievement section 30, which is an element of the control device. FIG. 3 is a block diagram illustrating the configuration of the achievement section 30 according to the present embodiment.

The achievement section 30 according to the present embodiment includes a conversion section 312, a conversion section 316, and a target combustion A/F setup section 314. In the first embodiment, the conversion section 302 corresponds to an inverse model of the internal combustion engine. In the present embodiment, however, the conversion section 312 and the conversion section 316 constitute an inverse model of the internal combustion engine. The target combustion A/F setup section 314 has a fixed value representing a target value for the combustion A/F ratio.

The achievement section 30 first causes the conversion section 312 to calculate three out of four necessary operation amounts, namely, the throttle opening, ignition timing, and fuel injection amount. The target values for the three controlled variables, namely, the torque, efficiency, and A/F ratio, are input into the conversion section 312. The conversion section 312 outputs the aforementioned three operation amounts converted from such target values. The remaining operation amount, that is, the fuel injection timing, is calculated by the conversion section 316. The fuel injection amount calculated by the conversion section 312 and the target value for the combustion A/F ratio are input into the conversion section 316. The conversion section 316 outputs the fuel injection timing that is converted from the fuel injection amount and the target value for the combustion A/F ratio. The engine information such as the engine speed is referenced during conversion processes in the conversion sections 312, 316.

Figure 4:
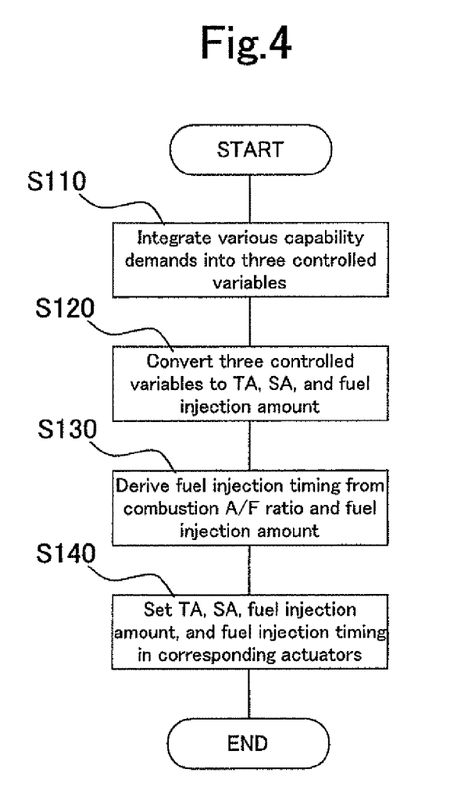
FIG. 4 is a flowchart illustrating a procedure for calculating each operation amount in accordance with the second embodiment of the present invention.

According to the present embodiment, the above-described functions of the achievement section 30 work to calculate the operation amounts by performing the steps indicated in a flowchart of FIG. 4. In step S110, which is the first step, various demands concerning the internal combustion engine capabilities, such as drivability, exhaust gas control, and fuel economy, are integrated into the three controlled variables, namely, the torque, efficiency, and air-fuel ratio. This process is performed by the target value setup section 20.

Next, step S120 is performed to convert the three controlled variables to the throttle opening (TA), ignition timing (SA), and fuel injection amount. This process is performed by the conversion section 312, which is an element of the achievement section 30.

Next, step S130 is performed to derive the fuel injection timing from the combustion A/F ratio target value set by the target combustion A/F setup section 314, the fuel injection amount calculated by the conversion section 312, and the engine information such as the engine speed. This process is performed by the conversion section 316, which is an element of the achievement section 30.

Finally, step S140 is performed to set in the actuators 2, 4, 6 the operation amounts calculated by the achievement section 30, namely, the throttle opening (TA), ignition timing (SA), fuel injection amount, and fuel injection timing.

As described above, the control device according to the present embodiment performs the calculation of the fuel injection timing separately from the calculations of the throttle opening, ignition timing, and fuel injection amount. When the operation amounts are calculated in the above-described manner, the target values for the controlled variables can be precisely reflected in the four operation amounts including the fuel injection timing while avoiding the complication of a calculation process necessary for the conversion of the controlled variables to the operation amounts.

The second embodiment of the present invention is as described above. The correspondence between the second embodiment and the present invention is the same as the correspondence between the first embodiment and the present invention except that the achievement section 30 configured as shown in FIG. 3 corresponds to the "operation amount setup means" according to the second, third, and seventh aspects of the present invention. The second embodiment assumes that the target value for the combustion A/F ratio is a fixed value. Alternatively, however, the target combustion A/F setup section 314 may have a fixed value that represents the target combustion A/F ratio for each operating state of the internal combustion engine. Another alternative is to determine the target value for the combustion A/F ratio from the target value for the A/F ratio that is a controlled variable.

Third Embodiment

Figure 5:
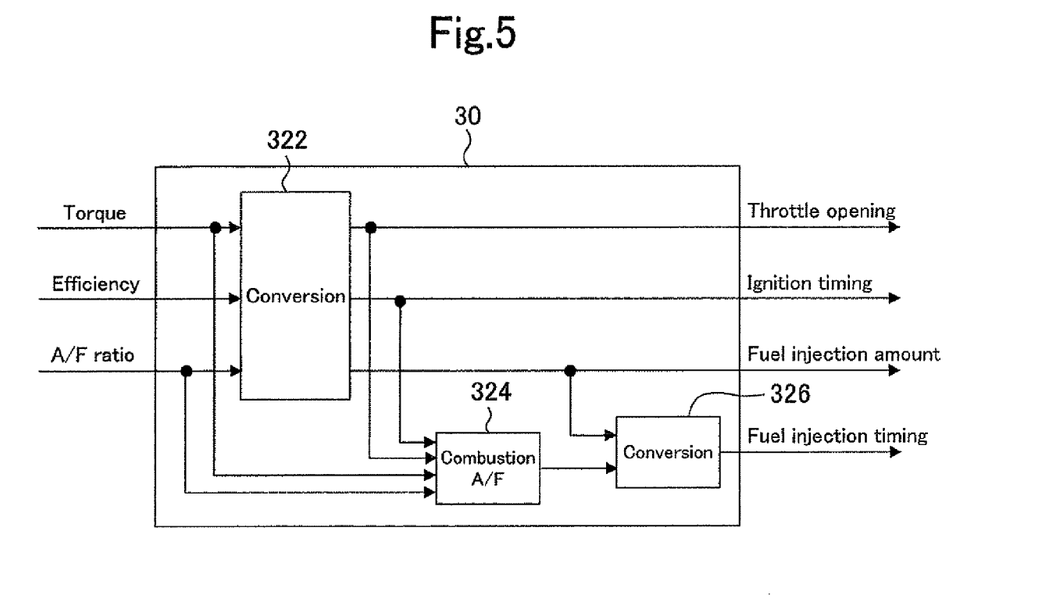
FIG. 5 is a block diagram illustrating the configuration of the achievement section according to a third embodiment of the present invention.

A third embodiment of the present invention will now be described with reference to FIGS. 1, 5, and 7.

The overall configuration of the control device according to the present embodiment is indicated by the block diagram in FIG. 1, as is the case with the first embodiment. The control device according to the present embodiment differs from the control device according to the first embodiment in the configuration and functions of the achievement section 30, which is an element of the control device. FIG. 5 is a block diagram illustrating the configuration of the achievement section 30 according to the present embodiment.

The achievement section 30 according to the present embodiment includes a conversion section 322, a conversion section 326, and a target combustion A/F setup section 324. In the first embodiment, the conversion section 302 corresponds to an inverse model of the internal combustion engine. In the present embodiment, however, the conversion section 322, the conversion section 326, and the target combustion A/F setup section 324 constitute an inverse model of the internal combustion engine.

The achievement section 30 first causes the conversion section 322 to calculate three out of four necessary operation amounts, namely, the throttle opening, ignition timing, and fuel injection amount. The target values for the three controlled variables, namely, the torque, efficiency, and A/F ratio, are input into the conversion section 322. The conversion section 322 outputs the aforementioned three operation amounts converted from such target values. The remaining operation amount, that is, the fuel injection timing, is calculated by the conversion section 326. The fuel injection amount calculated by the conversion section 322 and the target value for the combustion A/F ratio are input into the conversion section 326. The conversion section 326 outputs the fuel injection timing that is converted from the fuel injection amount and the target value for the combustion A/F ratio. The engine information such as the engine speed is referenced during conversion processes in the conversion sections 322, 326.

Figure 6:
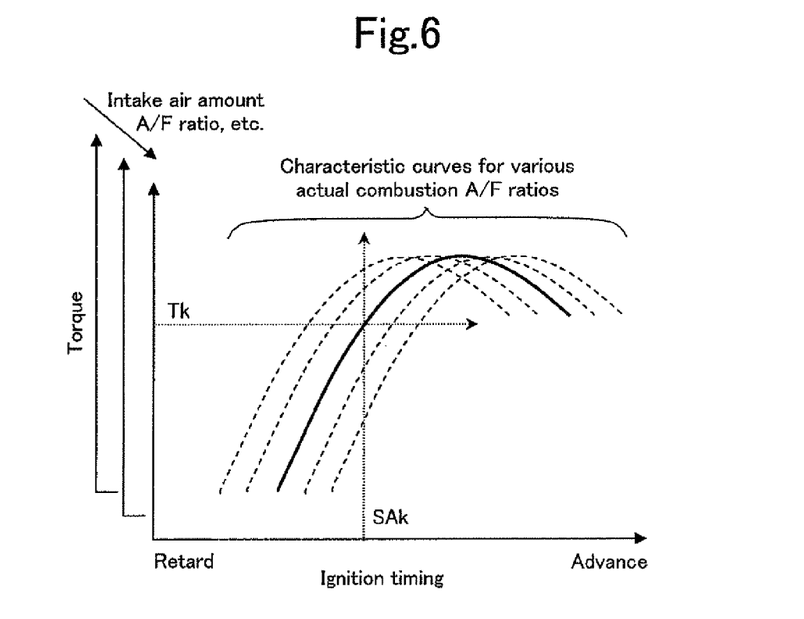
FIG. 6 is a diagram illustrating a procedure for setting a target value for a combustion air-fuel ratio in accordance with the third embodiment of the present invention.

The present embodiment is characterized in that the target value for the combustion A/F ratio is a variable. The torque, which is a controlled variable, and the throttle opening and ignition timing, which are operation amounts, are input into the target combustion A/F setup section 324. The target combustion A/F setup section 324 calculates the target value for the combustion A/F ratio from the input values. More specifically, the target combustion A/F setup section 324 includes a map that represents the torque-ignition timing characteristic as indicated in FIG. 6. The map is prepared for each torque factor (except the ignition timing and fuel injection timing) such as the intake air amount and A/F ratio. The target combustion A/F setup section 324 first calculates the intake air amount from the throttle opening, and then selects a map indicative of the torque-ignition timing characteristic in accordance with the intake air amount, the A/F ratio, and the like. As shown in FIG. 6, a plurality of torque-ignition timing characteristic curves are set in each map. These torque-ignition timing characteristic curves are set for various combustion A/F ratios. The reason is that the torque-ignition timing characteristic varies as the combustion rate varies with the actual combustion A/F ratio. The target combustion A/F setup section 324 examines the selected map to locate a torque-ignition timing characteristic curve that achieves both a desired torque Tk and a desired ignition timing SAk. Next, the target combustion A/F setup section 324 determines the combustion A/F ratio that obtains the located torque-ignition timing characteristic curve, and sets the determined combustion A/F ratio as the target value for the combustion A/F ratio.

Figure 7:
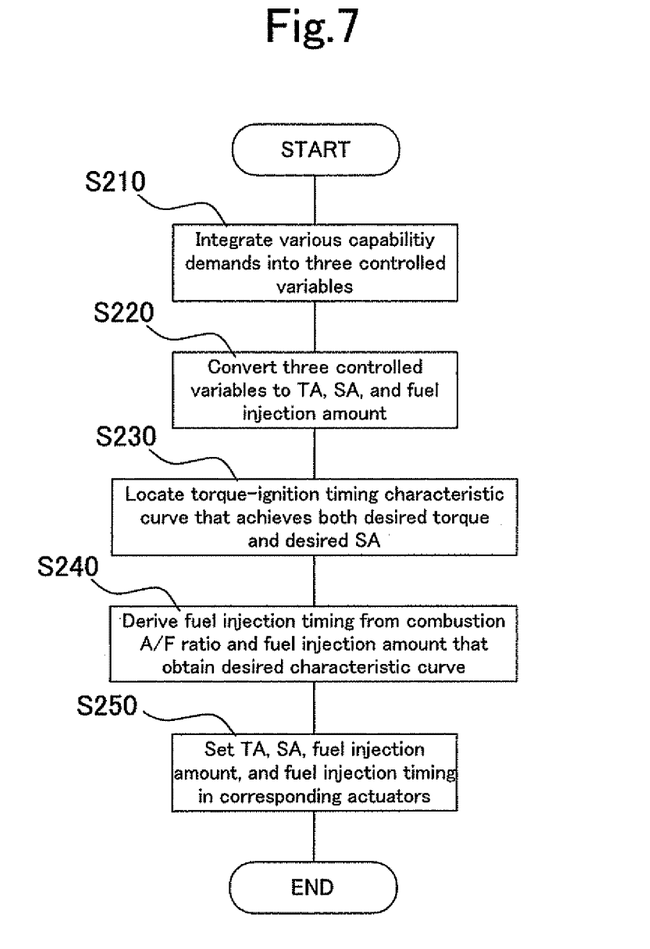
FIG. 7 is a flowchart illustrating a procedure for calculating each operation amount in accordance with the third embodiment of the present invention.

According to the present embodiment, the above-described functions of the achievement section 30 work to calculate the operation amounts by performing the steps indicated in a flowchart of FIG. 7. In step S210, which is the first step, various demands concerning the internal combustion engine capabilities, such as drivability, exhaust gas control, and fuel economy, are integrated into the three controlled variables, namely, the torque, efficiency, and air-fuel ratio. This process is performed by the target value setup section 20.

Next, step S220 is performed to convert the three controlled variables to the throttle opening (TA), ignition timing (SA), and fuel injection amount. This process is performed by the conversion section 322, which is an element of the achievement section 30.

Next, step S230 is performed to examine the map shown in FIG. 6 and locate a torque-ignition timing characteristic curve that achieves both a desired torque and a desired ignition timing. The combustion A/F ratio that obtains the located torque-ignition timing characteristic curve is then determined and set as the target value for the combustion A/F ratio. These processes are performed by the target combustion A/F setup section 324, which is an element of the achievement section 30.

Next, step S240 is performed to derive the fuel injection timing from the combustion A/F ratio target value set by the target combustion A/F setup section 324 and the fuel injection amount calculated by the conversion section 322. This process is performed by the conversion section 326, which is an element of the achievement section 30.

Step S250 is then performed to set in the actuators 2, 4, 6 the operation amounts calculated by the achievement section 30, namely, the throttle opening (TA), ignition timing (SA), fuel injection amount, and fuel injection timing.

As described above, the control device according to the present embodiment first determines the throttle opening, ignition timing, and fuel injection amount from the target values for the three controlled variables. Determining the throttle opening determines the intake air amount. The overall in-cylinder A/F ratio, which is a controlled variable, is then determined from the intake air amount and fuel injection amount. Further, the efficiency, which is another controlled variable, is determined by the ignition timing. The remaining controlled variable, that is, the torque, depends on the actual combustion A/F ratio. The control device according to the present embodiment locates a torque-ignition timing characteristic curve that corresponds to a desired torque and ignition timing, and sets a combustion A/F ratio for obtaining the located characteristic curve as the target value for the combustion A/F ratio. When the fuel injection timing is determined so as to achieve the target value for the combustion A/F ratio, which is set as described above, it is possible to achieve the target values for the three controlled variables, namely, the torque, efficiency, and A/F ratio, during the use of the earlier-determined three operation amounts. In other words, the control device according to the present embodiment ensures that the three controlled variables, namely, the torque, efficiency, and A/F ratio, are controlled simultaneously with high accuracy to follow their target values in any operating state.

The third embodiment of the present invention is as described above. The correspondence between the third embodiment and the first aspect of the present invention is the same as the correspondence between the first embodiment and the first aspect of the present invention except that the achievement section 30 configured as shown in FIG. 5 corresponds to the "operation amount setup means" according to the sixth and seventh aspects of the present invention.

If the actual combustion A/F ratio varies, the amount of air-fuel mixture that actually burns also varies. As the influence of such variation on the torque-ignition timing characteristic is insignificant, the map shown in FIG. 6 is constructed without considering the variation in the actual amount of air-fuel mixture. However, if the target value for the combustion A/F ratio is to be set with increased accuracy, the map may alternatively be changed to a three-dimensional map that considers the influence of the actual amount of air-fuel mixture. Another alternative is to correct the target value for the combustion A/F ratio, which is derived from the map shown in FIG. 6, by using, for instance, a map and coefficient that are predetermined by an experiment or the like.

Fourth Embodiment

A fourth embodiment of the present invention will now be described with reference to FIGS. 8 and 9.

First of all, the specifications for an internal combustion engine according to the fourth embodiment will be described as its prerequisites. The internal combustion engine according to the present embodiment operates while stratified charge combustion occurs. As actuators that control its operation, the internal combustion engine according to the present embodiment includes a throttle 2, which serves as an intake air amount adjustment valve; an ignition device 4, which adjusts the ignition timing; a fuel injection device 6, which injects fuel directly into a cylinder; and a swirl control valve (hereinafter referred to as the SCV) 8, which adjusts a swirl flow in the cylinder.

Figure 8:
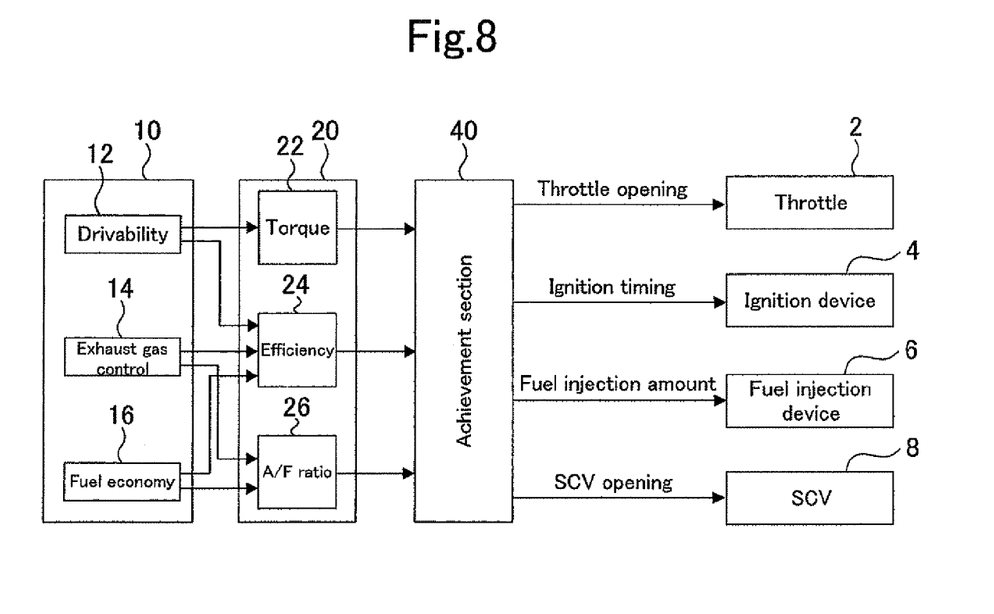
FIG. 8 is a block diagram illustrating the configuration of the internal combustion engine control device according to a fourth embodiment of the present invention.

The control device according to the present embodiment is configured as shown in a block diagram of FIG. 8. FIG. 8 shows each element of the control device in the form of a block. Signal transmissions (main signal transmissions) between the blocks are indicated by arrows. The overall configuration and features of the control device according to the present embodiment will be described below with reference to FIG. 8.

As shown in FIG. 8, the control device is roughly divided into three sections 10, 20, 40. The top-level section is a capability demand generation section 10. A target value setup section 20 is provided below the capability demand generation section 10. Further, an achievement section 40 is provided below the target value setup section 20. The aforementioned actuators 2, 4, 6, 8 are connected to the achievement section 40. The configurations of the capability demand generation section 10 and target value setup section 20 and the processes performed in such sections are the same as described in connection with the first embodiment. The configuration of the achievement section 40 according to the present embodiment and the process performed therein will be described below.

The achievement section 40 calculates the operation amounts of the actuators 2, 4, 6, 8 that are needed to achieve the target values for the three controlled variables, namely, the torque, efficiency, and A/F ratio, which are set by the target value setup section 20. The operation amounts to be calculated by the achievement section 40 are a throttle opening for operating the throttle, an ignition timing for operating the ignition device 4, a fuel injection amount for operating the fuel injection device 6, and an SCV opening for operating the SCV 8. Although a fuel injection timing is also an operation amount, the present embodiment does not handle it as an operation amount that is to be calculated from the three controlled variables, namely, the torque, efficiency, and A/F ratio. The fuel injection timing is predetermined as appropriate to achieve stratified charge combustion.

As described above, the present embodiment uses the SCV opening as an operation amount in addition to the throttle opening, ignition timing, and fuel injection amount. The in-cylinder swirl flow can be adjusted by changing the SCV opening. A change in the swirl flow would change the speed at which a gas clump having a rich air-fuel ratio, which is generated upon fuel injection, is transported to the vicinity of the ignition plug. Therefore, using the SCV opening as an operation amount makes it possible to adjust the A/F ratio in the vicinity of the ignition plug, that is, the actual combustion A/F ratio, independently of the overall in-cylinder A/F ratio.

Figure 9:
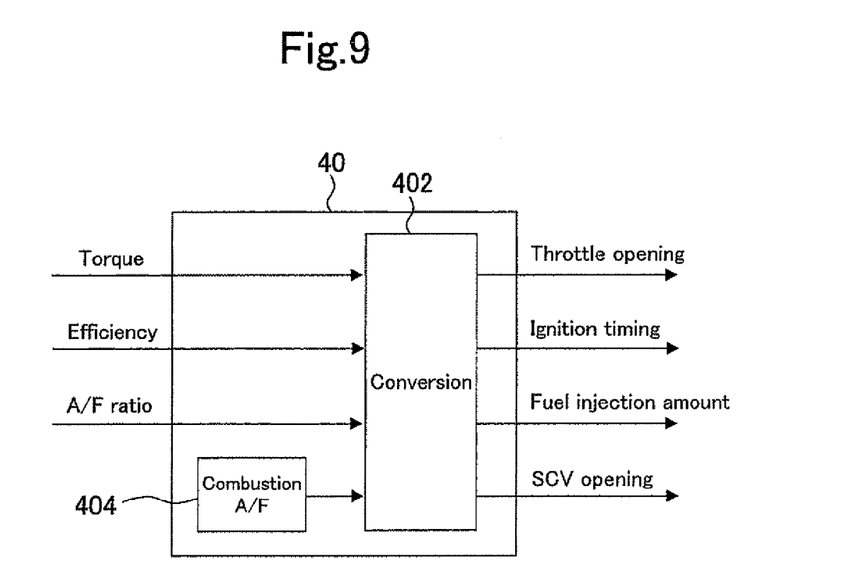
FIG. 9 is a block diagram illustrating the configuration of the achievement section according to the fourth embodiment of the present invention.

FIG. 9 is a block diagram illustrating the configuration of the achievement section 40. The achievement section 40 according to the present embodiment includes a target combustion A/F setup section 404. The target combustion A/F setup section 404 has a fixed value representing a target value for the combustion A/F ratio. Although the combustion A/F ratio is an important torque factor that governs the torque-ignition timing characteristic, it is not used as a controlled variable. The present embodiment uses the overall in-cylinder A/F ratio as a controlled variable. Precise torque control can be exercised when the target value for the combustion A/F ratio is generated within the achievement section 40 and used to calculate an actuator operation amount.

The achievement section 40 uses a conversion section 402 to calculate each operation amount. The conversion section 402 is an inverse model of the internal combustion engine according to the present embodiment, and composed of a plurality of statistical models and physical models that are expressed by maps and functions. The target values for the three controlled variables, namely, the torque, efficiency, and A/F ratio, and the target value for the combustion A/F ratio are input into the conversion section 402. The conversion section 402 outputs four operation amounts converted from such target values, namely, the throttle opening, ignition timing, fuel injection amount, and SCV opening. The engine information such as the engine speed and fuel injection timing is referenced during a conversion process in the conversion section 402.

The fourth embodiment of the present invention is as described above. The fourth embodiment can be modified in the same manner as the first embodiment. Further, the configuration of the achievement section 40 according to the fourth embodiment can be changed to the configuration shown in the block diagram of FIG. 3 or 5, as is the case with the configuration of the achievement section 30 according to the first embodiment. In such an instance, however, the achievement section 40 calculates the SCV opening instead of the fuel injection timing.

Other

It should be understood that the present invention is not limited to the particular embodiments described above. The "target value setup means," "operation amount setup means," and "operation amount output means" according to the present invention are embodied in the above-described embodiments. However, the configurations disclosed in the above-described embodiments are merely examples of a configuration that can be formed by the above-mentioned means. All configurations capable of implementing the functions of the above-mentioned means are included in the scope of the above-mentioned means.

The above-described embodiments can be variously modified without departing from the scope of the present invention. For example, although the above-described embodiments assume that a throttle is used as the intake air amount adjustment valve, an intake valve with an adjustment mechanism capable of continuously varying its lift amount or operating angle may alternatively be used as the intake air amount adjustment valve. In such an alternative case, the lift amount or operating angle serves as the operation amount of the intake air amount adjustment valve.

The "fourth operation amount" according to the present invention is not limited to the fuel injection timing or SCV opening. It may be any operation amount that adjusts the in-cylinder air-fuel ratio distribution. When, for instance, the internal combustion engine includes a tumble control valve, its valve opening may alternatively be used as the fourth operation amount. Further, the valve timing of an intake valve that is adjusted by a variable valve timing mechanism may alternatively be used as the fourth operation amount. These operation amounts are similar to the SCV opening in that they can adjust the speed at which a gas clump having a rich air-fuel ratio is transported to the vicinity of the ignition plug.

The device and method for controlling an internal combustion engine in accordance with the present invention are designed to control an internal combustion engine in which the air-fuel ratio in the vicinity of the ignition plug differs from the overall in-cylinder air-fuel ratio. The device and method according to the present invention are also applicable to an internal combustion engine in which combustion occurs while the in-cylinder A/F ratio distribution is intentionally made nonuniform. Stratified charge combustion described in connection with the above-described embodiments is merely an example of the aforementioned combustion during which the in-cylinder A/F ratio distribution is intentionally made nonuniform. Further, an internal combustion engine in which homogeneous combustion occurs can also be controlled by the device and method according to the present invention as far as the in-cylinder air-fuel ratio distribution turns out to be nonuniform depending on the operating status. Even if the combustion looks homogeneous when observed from a microscopic viewpoint, the in-cylinder A/F ratio distribution may become nonuniform. The A/F ratio in the vicinity of the ignition plug does not always coincide with the overall in-cylinder A/F ratio. The torque-ignition timing characteristic is affected by the A/F ratio in the vicinity of the ignition plug. Therefore, the accuracy of torque control can be enhanced by adjusting the in-cylinder A/F ratio distribution with the fourth operation amount.

The invention claimed is:

1. A control device that operates a plurality of actuators to control an internal combustion engine in which a combustion air-fuel ratio in a vicinity of an ignition plug differs from an overall air-fuel ratio in a cylinder, the control device comprising:

target value setup means which uses three physical quantities, namely, a torque, an efficiency that is a dimensionless parameter and is set with reference to an MBT ignition timing, and an overall air-fuel ratio, as controlled variables for the internal combustion engine, and sets a target value for each of the controlled variables integrating at least some demands concerning a capability of the internal combustion engine into the three physical quantities;

operation amount setup means comprising:
  means which converts the target values for each of the three controlled variables into three operation amounts, namely, a throttle opening, an ignition timing, and a fuel injection amount;
  means which obtains a target combustion air-fuel ratio based on torque-ignition timing characteristics defined by the target values for the torque and the overall air-fuel ratio and the operation amounts for the throttle opening and the ignition timing; and means which obtains a fourth operation amount based on the target combustion air-fuel ratio and the operation amount of the fuel injection amount; and operation amount output means which outputs each of the four operation amounts to the corresponding actuators to be operated.

2. The control device according to claim 1, wherein the operation amount setup means sets a fuel injection timing as the fourth operation amount.

3. A control method for operating a plurality of actuators to control an internal combustion engine in which a combustion air-fuel ratio in a vicinity of an ignition plug differs from an overall air-fuel ratio in a cylinder, the method comprising the steps of:

using three physical quantities, namely, a torque, an efficiency that is a dimensionless parameter and is set with reference to an MBT ignition timing, and an overall air-fuel ratio, as controlled variables for the internal combustion engine, and setting a target value for each of the controlled variables integrating at least some demands concerning a capability of the internal combustion engine into the three physical quantities;

converting the target values for each of the three controlled variables into three operation amounts, namely, a throttle opening, an ignition timing, and a fuel injection amount;

obtaining a target combustion air-fuel ratio based on torque-ignition timing characteristics defined by the target values for the torque and the overall air-fuel ratio and the operation amounts for the throttle opening and the ignition timing;

obtaining a fourth operation amount based on the target combustion air-fuel ratio and the operation amount of the fuel injection amount; and outputting each of the four operation amounts to the corresponding actuators to be operated.

4. The control method according to claim 3, wherein the step of converting the operation amounts includes the step of setting a fuel injection timing as the fourth operation amount.

5. A control device that operates a plurality of actuators to control an internal combustion engine in which a combustion air-fuel ratio in a vicinity of an ignition plug differs from an overall air-fuel ratio in a cylinder, the control device comprising:

a target value setup unit which uses three physical quantities, namely, a torque, an efficiency that is a dimensionless parameter and is set with reference to an MBT ignition timing, and an overall air-fuel ratio, as controlled variables for the internal combustion engine, and sets a target value for each of the controlled variables integrating at least some demands concerning a capability of the internal combustion engine into the three physical quantities;

an operation amount setup unit which, in accordance with the target values for the three controlled variables, namely, the torque, the efficiency, and the air-fuel ratio, sets three operation amounts, namely, an intake air amount adjustment valve opening, an ignition timing, and a fuel injection amount, and a fourth operation amount for adjusting an air-fuel ratio distribution in the cylinder; and an operation amount output unit comprising:
a unit which converts the target values for each of the three controlled variables into three operation amounts, namely, a throttle opening, an ignition timing, and a fuel injection amount;
a unit which obtains a target combustion air-fuel ratio based on torque-ignition timing characteristics defined by the target values for the torque and the overall air-fuel ratio and the operation amounts for the throttle opening and the ignition timing; and
a unit which obtains a fourth operation amount based on the target combustion air-fuel ratio and the operation amount of the fuel injection amount; and
a unit which outputs each of the four operation amounts to the corresponding actuators to be operated.

* * * * *